United States Patent
Kajihara

(10) Patent No.: US 11,899,998 B2
(45) Date of Patent: Feb. 13, 2024

(54) INFORMATION PROCESSING APPARATUS HAVING LOCK SETTER, METHOD FOR CONTROLLING INFORMATION PROCESSING APPARATUS, AND STORAGE MEDIUM

(71) Applicant: SEIKO EPSON CORPORATION, Tokyo (JP)

(72) Inventor: Mikihiro Kajihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/077,618

(22) Filed: Dec. 8, 2022

(65) Prior Publication Data
US 2023/0185501 A1    Jun. 15, 2023

(30) Foreign Application Priority Data
Dec. 9, 2021 (JP) .................................. 2021-199908

(51) Int. Cl.
*G06F 3/12* (2006.01)
*G06F 3/0482* (2013.01)

(52) U.S. Cl.
CPC .......... *G06F 3/1255* (2013.01); *G06F 3/0482* (2013.01); *G06F 3/1204* (2013.01)

(58) Field of Classification Search
None
See application file for complete search history.

(56) References Cited

U.S. PATENT DOCUMENTS

| 2009/0144367 A1* | 6/2009 | Tadokoro | G09B 5/02 709/204 |
| 2017/0212667 A1* | 7/2017 | Miyazaki | G06F 3/04817 |

FOREIGN PATENT DOCUMENTS

JP    2019-053584 A    4/2019

* cited by examiner

*Primary Examiner* — Andrew H Lam
(74) *Attorney, Agent, or Firm* — Oliff PLC

(57) ABSTRACT

An information processing apparatus includes a display configured to display at least one object, a lock setter configured to set, on the at least one object, a lock that is either a first lock with which the at least one object is selectable or a second lock with which the at least one object is non-selectable, and a display controller configured to cause the display to display lock information indicating whether the first lock or the second lock is set on the at least one object.

6 Claims, 17 Drawing Sheets

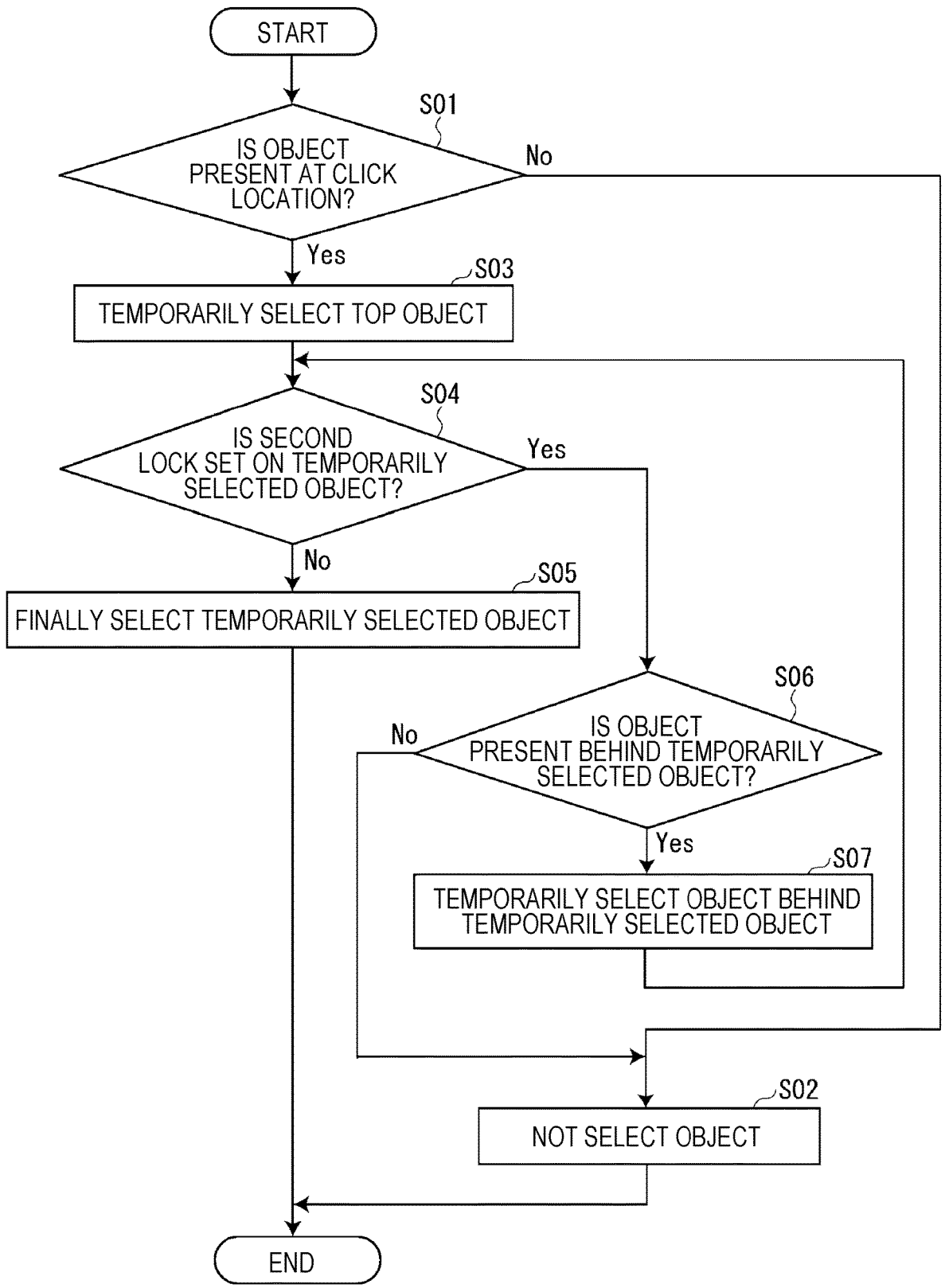

INFORMATION PROCESSING APPARATUS HAVING LOCK SETTER, METHOD FOR CONTROLLING INFORMATION PROCESSING APPARATUS, AND STORAGE MEDIUM

The present application is based on, and claims priority from JP Application Serial Number 2021-199908, filed Dec. 9, 2021, the disclosure of which is hereby incorporated by reference herein in its entirety.

BACKGROUND

1. Technical Field

The present disclosure relates to an information processing apparatus, a method for controlling an information processing apparatus, and a storage medium.

2. Related Art

As disclosed in JP-A-2019-053584, there is known a print data editing apparatus that displays a sign on a ruler in accordance with the location of an object and, when the sign is specified by the user, sets the object to a selected state. Thereby, even in a situation where, for example, a plurality of objects are displayed in an overlapping manner and therefore the user is unable to set a back object to a selected state by pointing a mouse pointer to the back object, the user may still set the back object to the selected state by specifying the sign.

Regarding the techniques disclosed in JP-A-2019-053584, it is difficult to intuitively understand how to set the back object to a selected state by specifying the sign on the ruler. To address this issue, when a plurality of objects are displayed in an overlapping manner, a non-selectable lock may be set on a front object, so that a back object is set to a selected state by a selection operation in an overlapping area between the objects. However, this method has a disadvantage in that the user is unable to determine whether a non-selectable lock or a selectable lock is set on the front object.

SUMMARY

According to a first aspect of the present disclosure, an information processing apparatus includes a display configured to display at least one object, a lock setter configured to set, on the at least one object, a lock that is either a first lock with which the at least one object is selectable or a second lock with which the at least one object is non-selectable, and a display controller configured to cause the display to display lock information indicating whether the first lock or the second lock is set on the at least one object.

According to a second aspect of the present disclosure, a method for controlling an information processing apparatus is performed by an information processing apparatus. The method includes setting, on the object, a lock that is either a first lock with which the object is selectable or a second lock with which the object is non-selectable, and causing a display to display lock information indicating whether the first lock or the second lock is set on the object.

According to a third aspect of the present disclosure, a non-transitory computer-readable storage medium stores a program causing an information processing apparatus to execute setting, on the object, a lock that is either a first lock with which the object is selectable or a second lock with which the object is non-selectable, and causing a display to display lock information indicating whether the first lock or the second lock is set on the object.

BRIEF DESCRIPTION OF THE DRAWINGS

FIG. 17 is a flowchart illustrating the flow of an object selection process.

DESCRIPTION OF EXEMPLARY EMBODIMENTS

Figure 1:
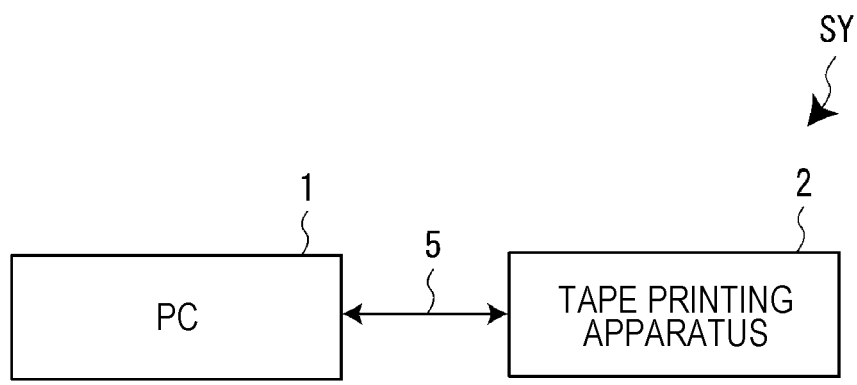
FIG. 1 is a system configuration diagram of a tape printing system.

Hereafter, an information processing apparatus, a method for controlling an information processing apparatus, and a storage medium will be described below with reference to the accompanying drawings. FIG. 1 is a system configuration diagram of a tape printing system SY. The tape printing system SY includes a personal computer (PC) 1 and a tape printing apparatus 2, which are communicatively coupled to each other via a cable 5. The PC 1 is an example of an information processing apparatus. The PC 1 and the tape printing apparatus 2 may be connected to each other via wireless communication or via a network, instead of being coupled to each other via the cable 5.

Figure 2:
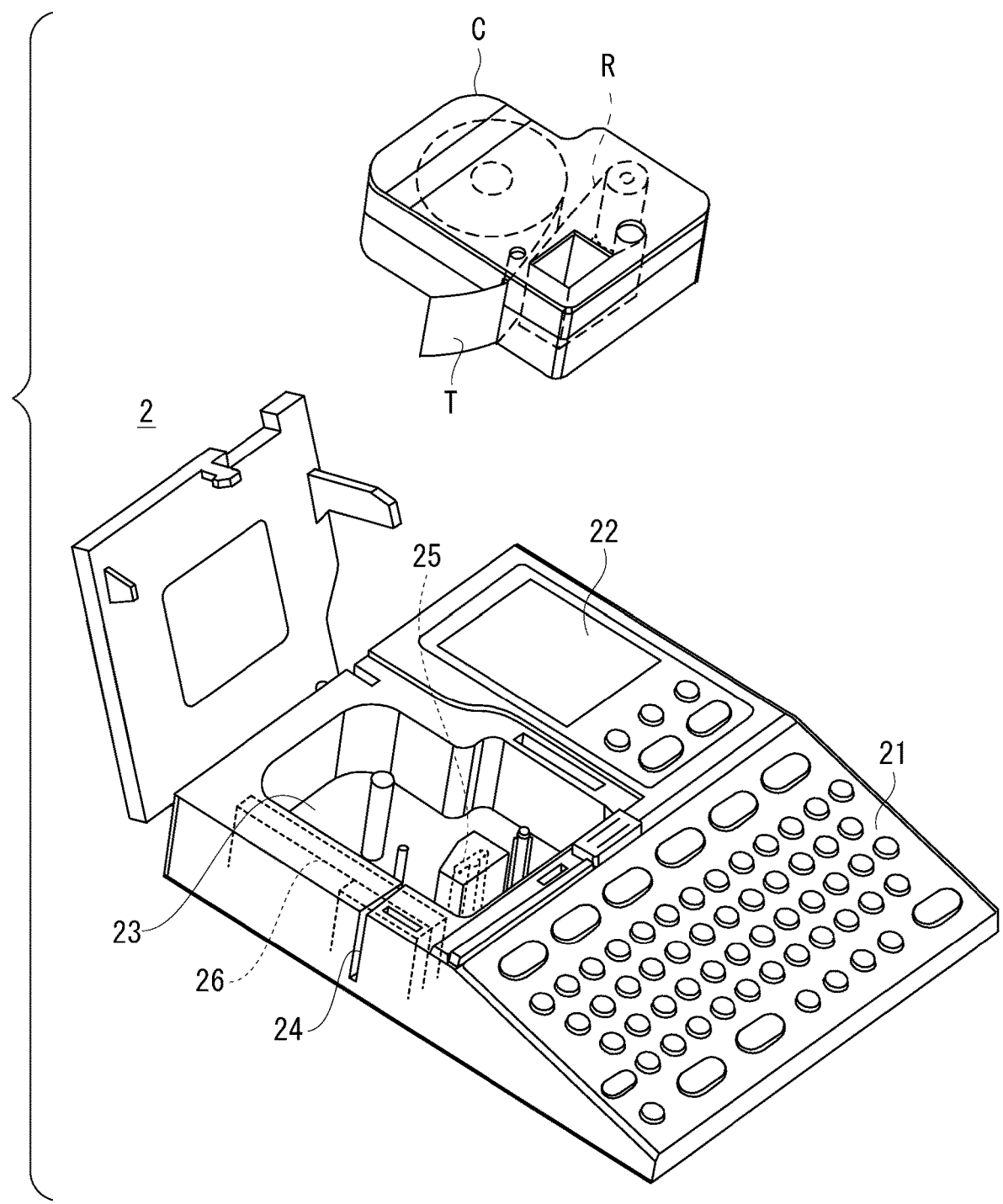
FIG. 2 is a pictorial representation of a tape printing apparatus and a tape cartridge.

The PC 1 generates print data for printing on a tape T, which is a printing medium of the tape printing apparatus 2 as illustrated in FIG. 2, and transmits the generated print data to the tape printing apparatus 2. The tape printing apparatus 2 prints a print image on the tape T based on the print data transmitted from the PC 1.

Figure 3:
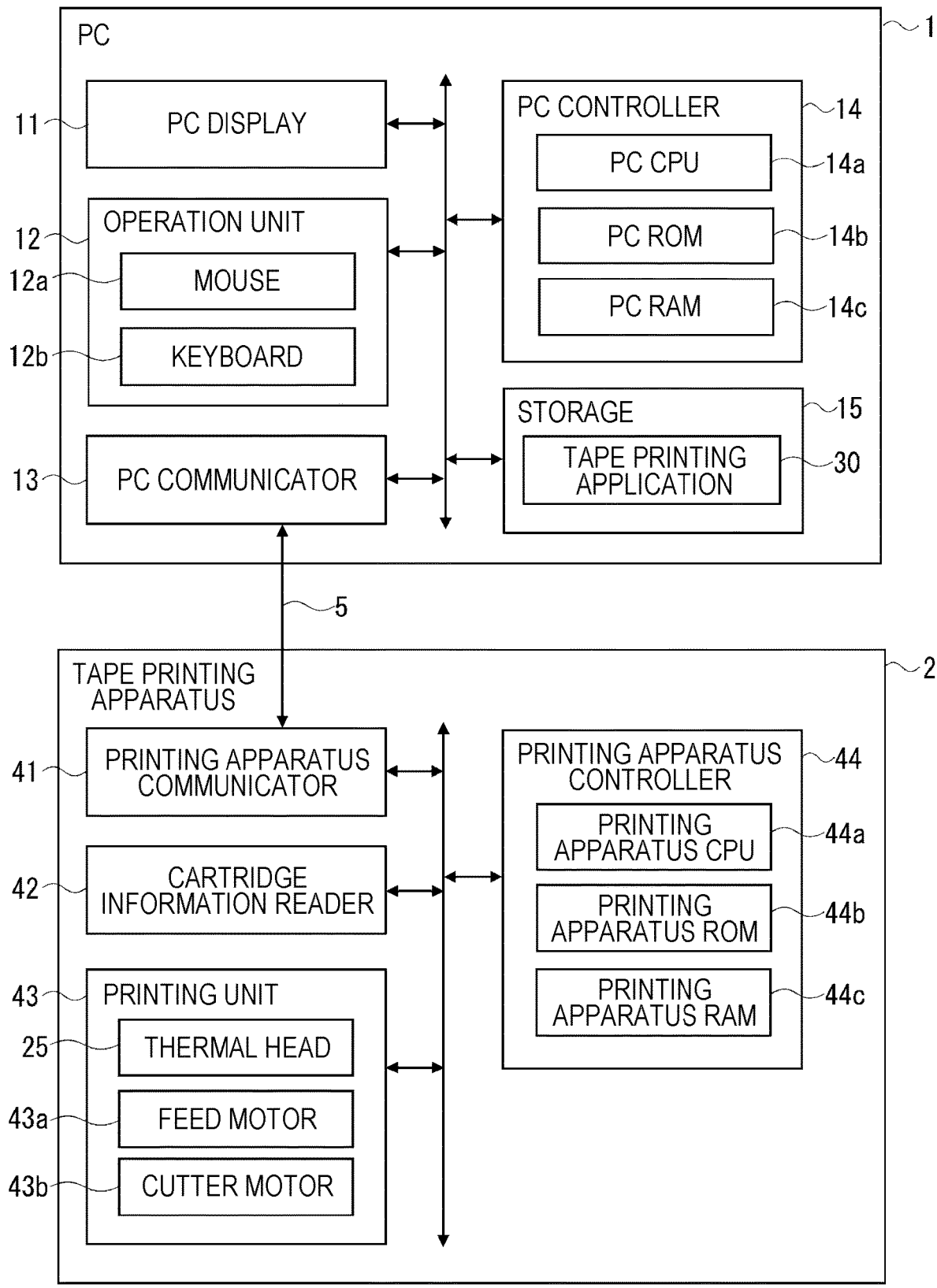
FIG. 3 is a block diagram illustrating hardware configurations of a personal computer (PC) and the tape printing apparatus.
Figure 5:
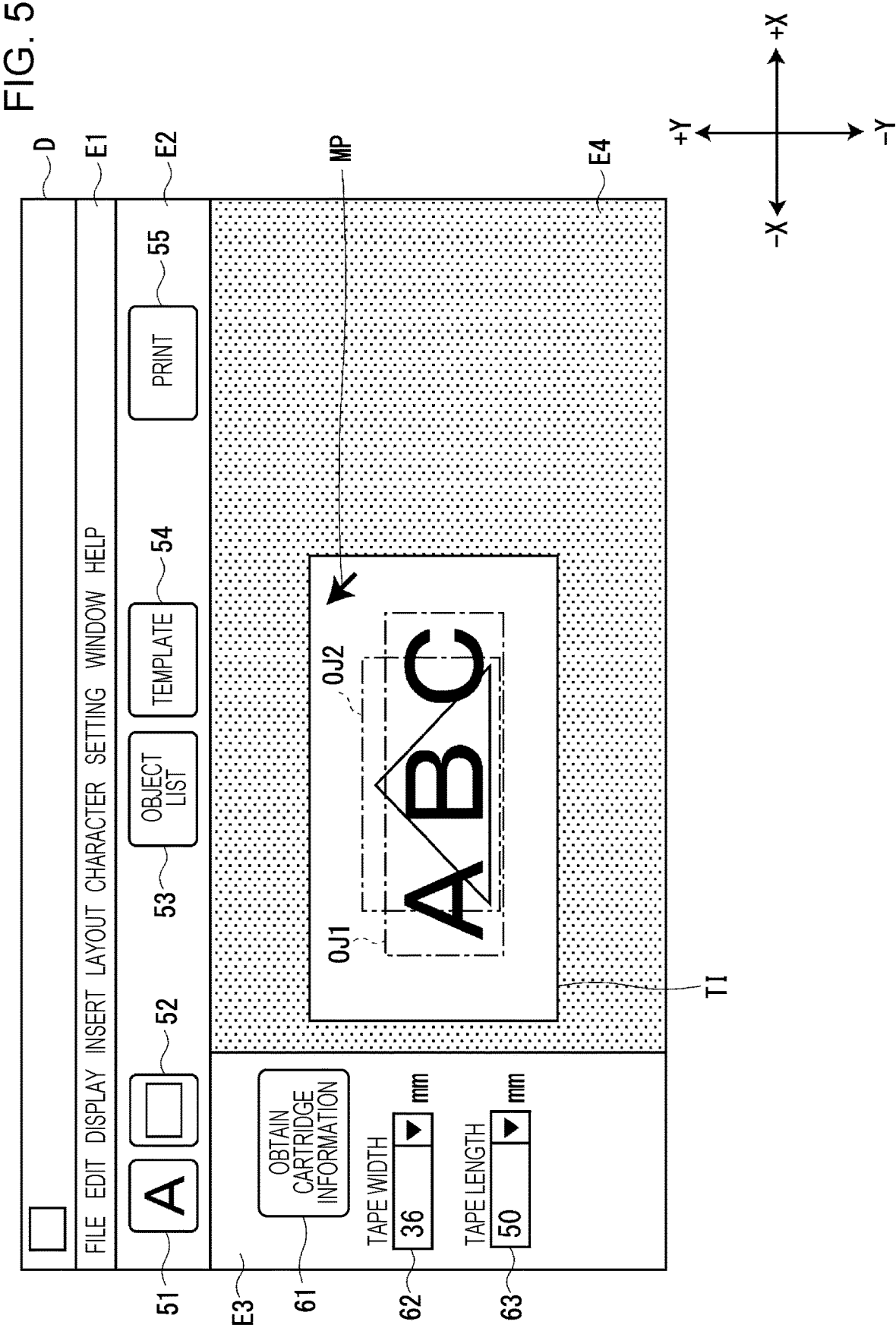
FIG. 5 is a pictorial representation of a display example of an edit screen on which a first object and a second object are displayed in a layout area.

The PC 1 displays, on a PC display 11 as illustrated in FIG. 3, an edit screen D depicted in FIG. 5 and other figures for editing a print image. On the edit screen D, objects OJ are edited as editing of a print image. The objects OJ refer to display elements such as text and graphics. The graphics include, in addition to polygons and circles, tables, ruled lines, and illustrations.

In the present embodiment, editing the objects OJ, particularly setting a lock on the object OJ, will mainly be described. "Setting a lock" refers to setting for disabling the movement of the object OJ. That is, the object OJ on which a lock is set has a fixed position until the lock is released.

FIG. 2 is a pictorial representation of the tape printing apparatus 2 and the tape cartridge C. The tape printing apparatus 2 includes an operation key group 21, a printing apparatus display 22, a cartridge attachment portion 23, and a tape outlet 24.

The operation key group 21 receives various operations of the user, such as editing of a print image. The printing apparatus display 22 displays various types of information, such as an editing screen for editing a print image. The tape printing apparatus 2 is capable of editing the object OJ as editing of a print image. However, in the present embodiment, the PC 1 edits the object OJ. In addition, the tape printing apparatus 2 receives, as print data, a result of editing of the object OJ performed by the PC 1 and carries out printing based on the received print data.

The tape cartridge C is detachably attached to the cartridge attachment portion 23. In the tape cartridge C, a tape T and an ink ribbon R are contained within the case.

The cartridge attachment portion 23 is provided with a thermal head 25. The thermal head 25, with the tape cartridge C attached to the cartridge attachment portion 23, performs heat generation driving in accordance with print data transmitted from the PC 1. Thereby, ink of the ink ribbon R is transferred onto the tape T, such that a print image based on the print data is printed on the tape T.

The printed tape T is exhausted from the tape outlet 24. A cutter 26 is provided between the cartridge attachment portion 23 and the tape outlet 24. The cutter 26 cuts the tape T in its width direction. Thereby, the printed portion is cut off from the tape T.

FIG. 3 is a block diagram illustrating hardware configurations of the PC 1 and the tape printing apparatus 2. The PC 1 includes the PC display 11, an operation unit 12, a PC communicator 13, a PC controller 14, and a storage 15. The PC display 11 is an example of a display.

The PC display 11 displays various types of information, such as the edit screen D. The operation unit 12 includes a mouse 12a and a keyboard 12b. The mouse 12a includes a left button and a right button. Hereafter, pressing the left button of the mouse 12a will be referred to as left-clicking, and pressing the right button as right-clicking. The keyboard 12b is a typical one including letter keys and number keys.

The PC communicator 13 communicates with the tape printing apparatus 2 via the cable 5. For example, the PC communicator 13 transmits print data to the tape printing apparatus 2 and receives, from the tape printing apparatus 2, cartridge information indicating the type of the tape cartridge C attached to the tape printing apparatus 2.

The PC controller 14 includes a PC central processing unit (CPU) 14a, a PC read-only memory (ROM) 14b, and a PC random-access memory (RAM) 14c.

The PC CPU 14a performs various types of control by loading, on the PC RAM 14c, various programs stored in the PC ROM 14b and the storage 15 described below and executing the programs. The PC controller 14 may use, as a processor, hardware circuitry, such as an application specific integrated circuit (ASIC), instead of the PC CPU 14a. In addition, the processor may have a configuration in which one or more CPUs and hardware circuitry, such as the ASIC, operate in cooperation with each other.

The PC ROM 14b stores non-changing control programs and control data. In addition, the PC RAM 14c is used as ap work area for various types of control performed by the PC CPU 14a.

The storage 15, which is, for example, a hard disk drive, stores a tape printing application 30. The tape printing application 30 is an example of a program. The tape printing application 30 is an application program for displaying the edit screen D, generating print data, communicating with the tape printing apparatus 2, and so on. In addition, the storage 15 stores a plurality of templates 90 illustrated in FIG. 16 as a part of the tape printing application 30. The template 90 is a pattern including text and graphics and is handled as the object OJ.

The tape printing apparatus 2 includes a printing apparatus communicator 41, a cartridge information reader 42, a printing unit 43, and a printing apparatus controller 44.

The printing apparatus communicator 41 communicates with the PC 1 via the cable 5.

The cartridge information reader 42 optically reads a code image affixed as a label to the tape cartridge C attached to the cartridge attachment portion 23 or reads out cartridge information from a circuit board (not illustrated) including a memory element provided in the tape cartridge C. The cartridge information includes information indicating the tape width of the tape T contained in the tape cartridge C.

The printing unit 43 is a mechanism for printing on the tape T and includes the thermal head 25, a feed motor 43a, and a cutter motor 43b. The thermal head 25, which includes a plurality of heating elements, thermally transfers ink from the ink ribbon R onto the tape T to carry out printing. The feed motor 43a is a drive source that feeds the tape T and the ink ribbon R. The cutter motor 43b is a drive source for driving the cutter 26.

The printing apparatus controller 44 includes a printing apparatus CPU 44a, a printing apparatus ROM 44b, and a printing apparatus RAM 44c.

The printing apparatus CPU 44a performs various types of control by loading, on the printing apparatus RAM 44c, control programs, such as firmware, stored in the printing apparatus ROM 44b and executing the control programs. The printing apparatus controller 44 may use, as a processor, hardware circuitry, such as an ASIC, instead of the printing apparatus CPU 44a. In addition, the processor may have a configuration in which one or more CPUs and hardware circuitry, such as the ASIC, operate in cooperation with each other.

The printing apparatus CPU 44a uses a control program stored in the printing apparatus ROM 44b to carry out printing on the tape T unreeled from the tape cartridge C based on print data transmitted from the PC 1. In addition, in response to receiving a cartridge information request signal from the PC 1 and in response to receiving print data, the printing apparatus CPU 44a obtains cartridge information via the cartridge information reader 42 and transmits the obtained cartridge information to the PC 1.

Figure 4:
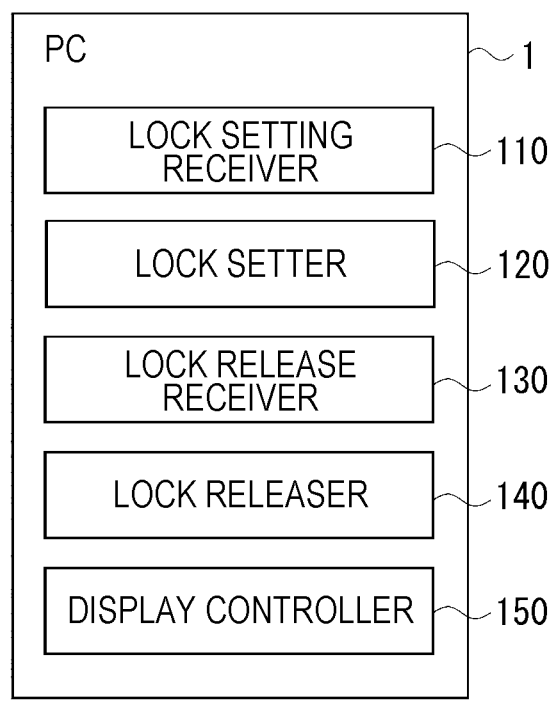
FIG. 4 is a block diagram illustrating a functional configuration of the PC.

FIG. 4 is a block diagram illustrating a functional configuration of the PC 1. The PC 1 includes, as the functional configuration, a lock setting receiver 110, a lock setter 120, a lock release receiver 130, a lock releaser 140, and a display controller 150. All of these functions are functions implemented by the PC CPU 14a executing the tape printing application 30.

The lock setting receiver 110 receives selection of the object OJ that is to be locked. The lock setting receiver 110 receives selection of the object OJ and lock setting for the selected object OJ. The object OJ is selected by left-clicking the mouse 12a with a mouse pointer MP displayed in the region of the object OJ. The lock setting receiver 110 receives, as lock setting, either first lock setting or second lock setting described below.

The lock setter 120 sets, on the object OJ, a lock that is either a first lock with which the object OJ is selectable and is incapable of moving or a second lock with which the object OJ is non-selectable and is incapable of moving. The object OJ on which the first lock is set is incapable of moving but is selectable and therefore may be edited or deleted. In contrast, the object OJ on which the second lock is set is non-selectable and therefore is incapable of moving, being edited, or being deleted.

When the first lock setting for the object OJ is received by the lock setting receiver 110, the lock setter 120 sets the first lock on the object OJ. In addition, when the second lock setting for the object OJ is received by the lock setting receiver 110, the lock setter 120 sets the second lock on the object OJ.

In addition, when the template 90 is read out from the storage 15, the lock setter 120 sets the second lock on the template 90 that is displayed on the PC display 11. That is, the template 90, on which the second lock has been set by the lock setter 120, is displayed on the PC display 11.

The lock release receiver 130 receives selection of the object OJ on which the lock is to be released. The lock release receiver 130 receives selection of the object OJ and lock release for the selected object OJ.

Figure 14:
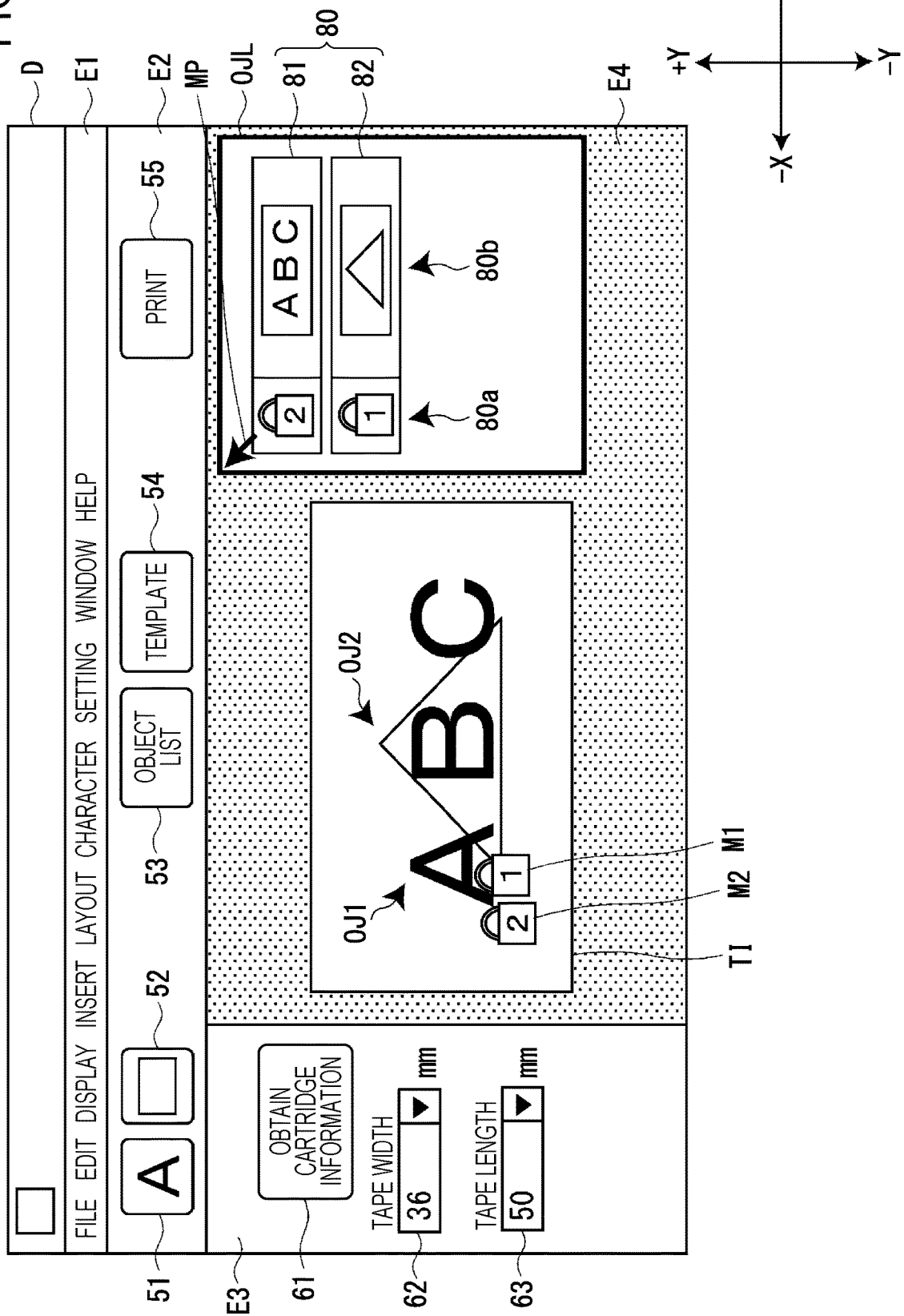
FIG. 14 is a pictorial representation of a display example of the edit screen on which an object list is displayed in the layout area.
Figure 15:
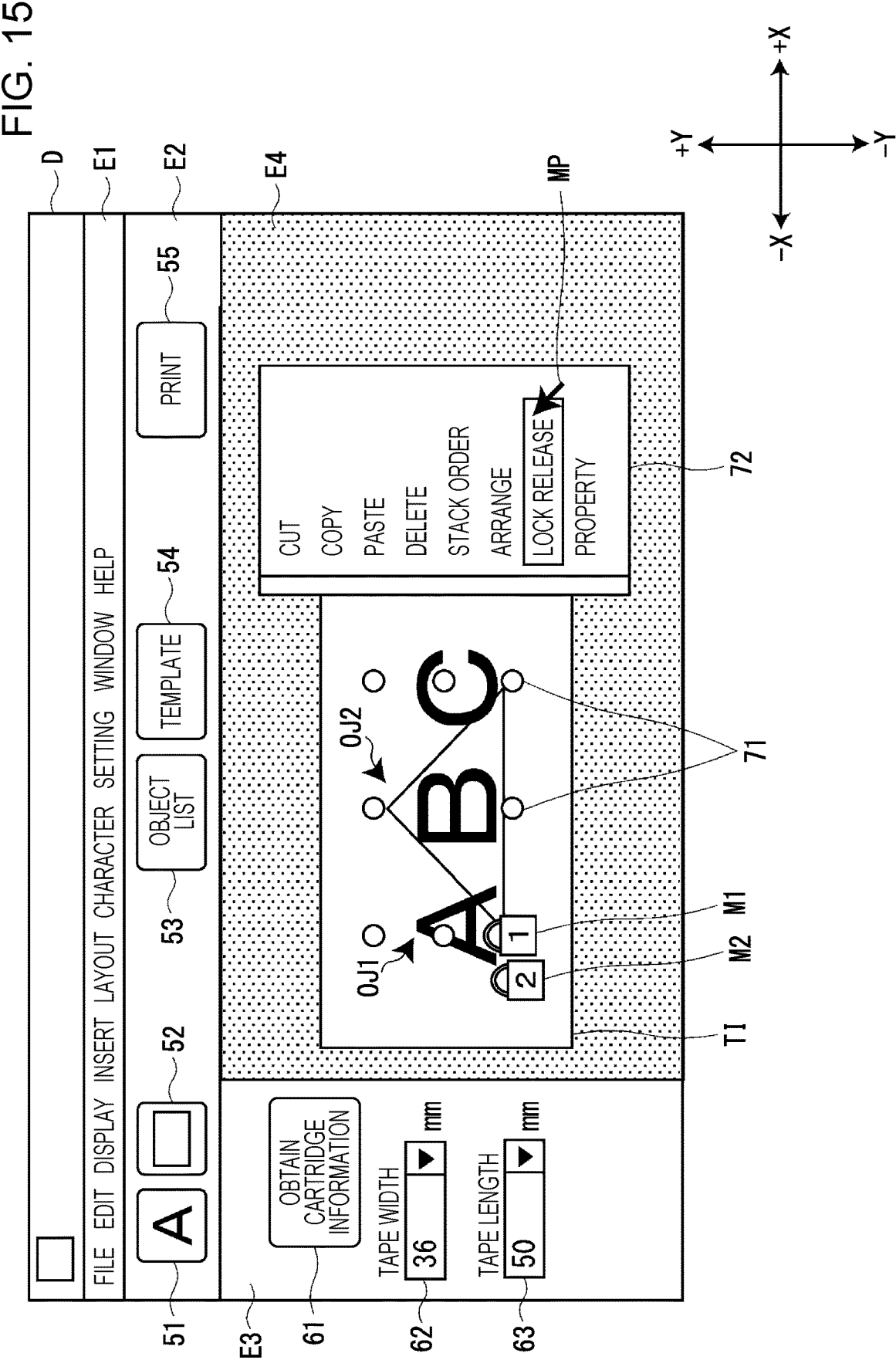
FIG. 15 is a pictorial representation of a display example of the edit screen on which a context menu is displayed in the layout area.

Regarding the object OJ on which the first lock is set, the lock release receiver 130 receives release of the lock using an object list OJL depicted in FIG. 14 or a context menu 72 depicted in FIG. 15. The object list OJL is a list of the objects OJ on each of which a lock is set. In addition, the context menu 72 is a menu that is displayed by right-clicking the mouse 12a while the object OJ is selected.

In contrast, regarding the object OJ on which the second lock is set, the lock release receiver 130 is unable to select the object OJ and is unable to cause the context menu 72 to be displayed, and therefore receives release of the lock by using the object list OJL.

The lock releaser 140 releases the lock on the object OJ the selection of which has been received by the lock release receiver 130. The lock releaser 140 releases the first lock if the first lock is set on the object OJ the selection of which has been received, and releases the second lock if the second lock is set on the object OJ the selection of which has been received.

The display controller 150 causes the PC display 11 to display lock information indicating whether the first lock or the second lock is set on the object OJ. The lock information is displayed on the PC display 11 but will not be printed. More specifically, the display controller 150 causes the lock information depicted in FIG. 5 and other figures to be displayed in a layout area E4 of the edit screen D displayed on the PC display 11.

According to the present embodiment, the lock information is a lock decoration that is applied to the object OJ. At least a portion of the lock decoration is displayed within an object region including the frame of the object OJ. The display controller 150 causes the PC display 11 to display the object OJ to which a first lock decoration is applied when the first lock is set on the object OJ, and to display the object OJ to which a second lock decoration different from the first lock decoration is applied when the second lock is set on the object OJ. According to the present embodiment, the lock decoration is a lock mark M displayed at a location in the −X direction and the −Y direction of the region of the object OJ depicted in FIG. 7 and other figures.

The display controller 150 decorates the object OJ on which the first lock is set, by adding a first lock mark M1 to the object OJ, and decorates the object OJ on which the second lock is set, by adding a second lock mark M2 to the object OJ. The first lock mark M1 is a mark in which a numeric character "1" is superimposed on a lock illustration. The second lock mark M2 is a mark in which a numeric character "2" is superimposed on a lock illustration.

In addition, the display controller 150 causes the PC display 11 to display the selected object OJ to which a selection decoration, which indicates that the object OJ is selected, is applied. According to the present embodiment, the selection decoration is handles 71 surrounding the region of the object OJ depicted in FIG. 6 and other figures.

Next, with reference to FIGS. 5 to 16, editing of the objects OJ using the edit screen D will be described by way of a specific example. With reference to these figures, a description is given using the directions of the XY coordinate system. However, these directions are used merely for convenience of description and are not intended to limit embodiments. The edit screen D is a screen that is displayed on the PC display 11 by the tape printing application 30 being started. The edit screen D includes a tab menu area E1, a function button area E2, a cartridge information area E3, and the layout area E4.

In the tab menu area E1, a plurality of tabs, such as "File" and "Edit", are displayed. When the user selects any tab from among the tabs in the tab menu area E1, the PC 1 displays a function menu (not illustrated) associated with the tab.

In the function button area E2, a text button 51, a graphics button 52, an object list button 53, a template button 54, and a print button 55 are displayed.

The text button 51 is a button for inputting text. When, while the text button 51 is selected, the user moves the mouse pointer MP to the layout area E4 and left-clicks the mouse 12a, the PC 1 inputs text using the mouse pointer MP.

The graphics button 52 is a button for inserting graphics. When the user selects the graphics button 52, the PC 1 displays a graphics menu of "polygon", "circle", and so on. When, while any graphic is selected from the graphics menu, the user moves the mouse pointer MP to the layout area E4 and drags the mouse 12a, the PC 1 draws the selected graphic to a size in accordance with the drag amount from the drag start position in the layout area E4.

The object list button 53 is a button for displaying the object list OJL. When the user selects the object list button 53, the PC 1 displays the object list OJL at a location in the +X direction and the +Y direction of the layout area E4.

The template button 54 is a button for inserting the template 90 into the layout area E4. When the user selects the template button 54, the PC 1 displays a template menu (not illustrated). When, while any template 90 is selected from the template menu, the user moves the mouse pointer MP to the layout area E4 and left-clicks the mouse 12a, the PC 1 displays the selected template 90 at the location of the mouse pointer MP.

The print button 55 is a button for carrying out printing. When the user selects the print button 55, the PC 1 generates print data based on an editing result of the objects OJ in the layout area E4 and transmits the generated print data to the tape printing apparatus 2.

In the cartridge information area E3, a cartridge information obtaining button 61, a tape width area 62, and a tape length area 63 are displayed.

The cartridge information obtaining button 61 is a button for obtaining cartridge information from the tape printing apparatus 2. When the user selects the cartridge information obtaining button 61, the PC 1 transmits a cartridge information request signal to the tape printing apparatus 2. After transmission of the cartridge information request signal, in response to receiving cartridge information from the tape printing apparatus 2, the PC 1 displays a tape width in the tape width area 62 based on information indicating a tape width included in the cartridge information. In addition, the PC 1 displays, in the layout area E4, a tape image TI having a tape width displayed in the tape width area 62 depicted in FIG. 5 and other figures.

The tape width area 62 is an area for displaying a tape width. As described above, in response to receiving cartridge information from the tape printing apparatus 2, the PC 1 displays a tape width in the tape width area 62 based on the cartridge information. In addition, when the user selects a tape width from a pull-down menu in the tape width area 62, the PC 1 displays the selected tape width. In this case, the PC 1 also displays, in the layout area E4, the tape image TI having the tape width in the tape width area 62 selected by the user. When the tape width is selected by the user, the tape width of the tape T contained in the tape cartridge C is not likely to match the selected tape width. In this case, at a point in time at which the user selects the print button 55 to issue an instruction for printing, warning is displayed on the editing screen D.

The tape length area 63 is an area for displaying a tape length. The PC 1 displays the length of the tape T to be created, in the tape length area 63, based on an editing result of the objects OJ in the layout area E4. The PC 1 changes the length of the tape image TI in accordance with the editing result of the objects OJ in the layout area E4, and, in conjunction with this, updates the tape length displayed in the tape length area 63.

In the layout area E4, the tape image TI mentioned above, the objects OJ created by the user, and the mouse pointer MP are displayed. In the example of FIG. 5, a first object OJ1 indicating text "ABC" and a second object OJ2 indicating a triangle shape are displayed as the objects OJ. In FIG. 5, the dash-dot lines surrounding the first object OJ1 and the second object OJ2 are virtual lines indicating object regions and are not actually displayed in the layout area E4. Although the description of the present embodiment given hereafter uses an example in which two objects OJ, the first object OJ1 and the second object OJ2, are arranged in the layout area E4, the same or similar operations may be performed even when three or more objects OJ are arranged in the layout area E4.

In addition, in the example of FIG. 5, the first object OJ1 and the second object OJ2, which is located behind the first object OJ1, overlapping each other are displayed. In the example of FIG. 5, the background of the first object OJ1 is set to be transparent, which causes the second object OJ2 to be visible in the overlapping area between the first object OJ1 and the second object OJ2.

Figure 6:
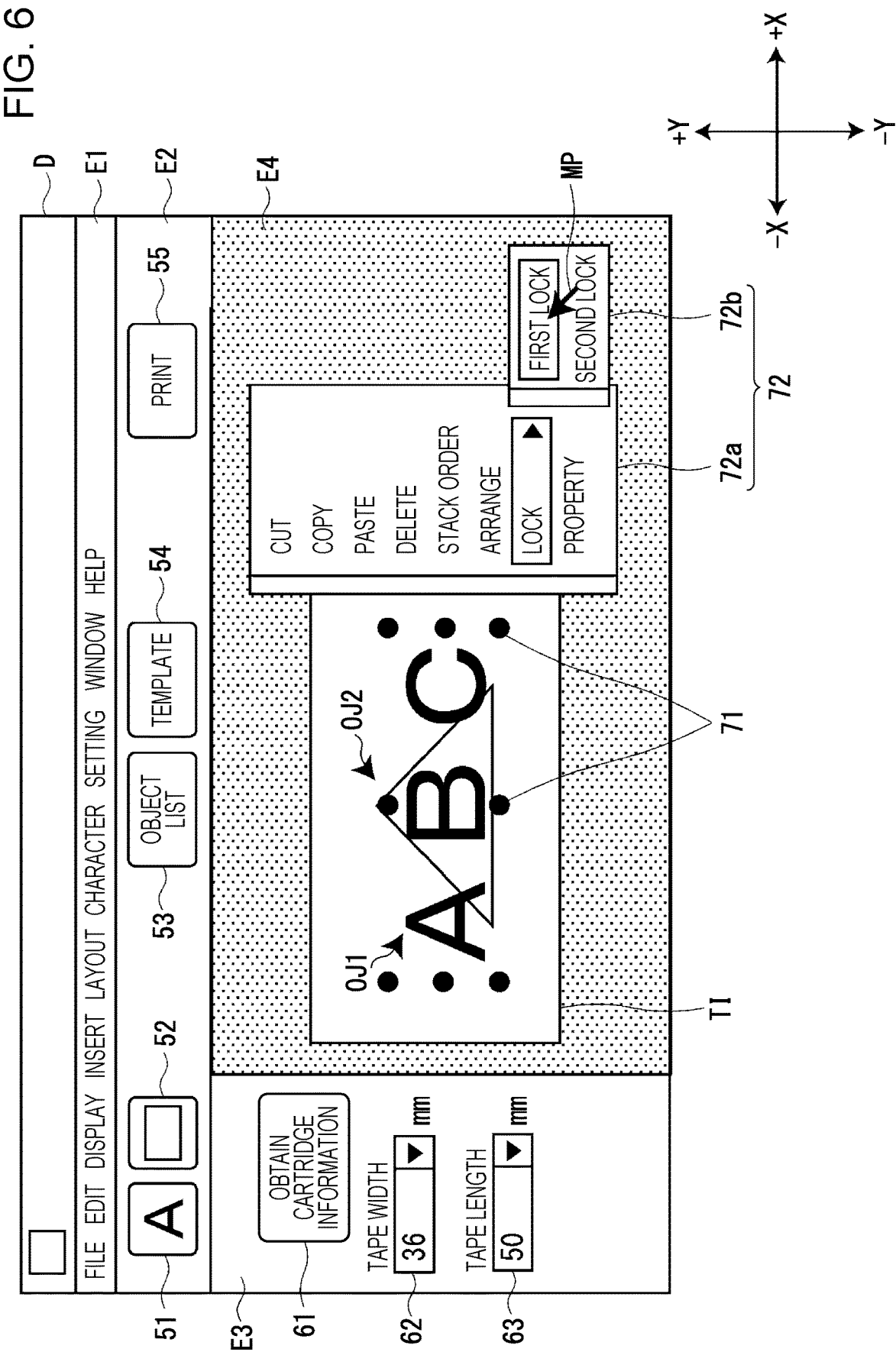
FIG. 6 is a pictorial representation of a display example of the edit screen on which a first context menu and a second context menu are displayed in the layout area.

FIG. 6 depicts a state where, from the state depicted in FIG. 5, the first object OJ1 has been selected and furthermore the context menu 72 has been displayed by the user. In response to selection of the first object OJ1, the PC 1 adds the handles 71 indicating the selection to the first object OJ1. At this point, the color of the handles 71 is, for example, blue.

When, while the handles 71 are added to the first object OJ1, the user right-clicks the mouse 12a, the PC 1 displays a first context menu 72a. In the first context menu 72a, operation menu including options such as "cut" and "copy" for the object OJ are displayed. The operation menu includes "lock" that is an option for setting a lock.

When the user selects "lock" from the first context menu 72a, the PC 1 displays a second context menu 72b. In the second context menu 72b, two options, "first lock" and "second lock", are displayed. When, while the handles 71 are added to the first object OJ1, the user selects "first lock" from the second context menu 72b, the PC 1 sets the first lock on the first object OJ1. In addition, when, while the handles 71 are added to the first object OJ1, the user selects "second lock" from the second context menu 72b, the PC 1 sets the second lock on the first object OJ1. Selection of the first object OJ1 in FIG. 6 corresponds to the selection of the object OJ that is to be locked, which is received by the lock setting receiver 110 mentioned above.

Figure 7:
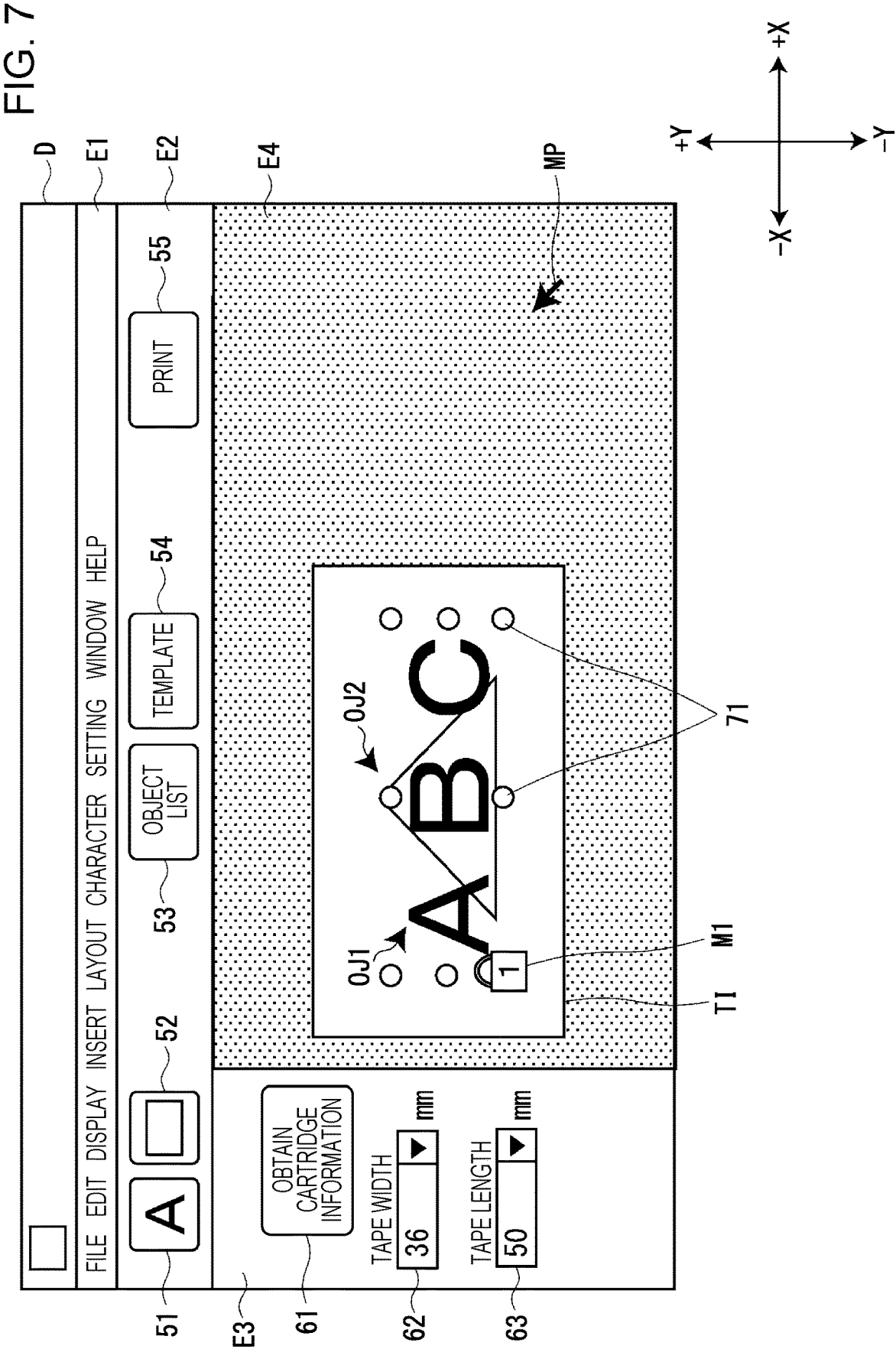
FIG. 7 is a pictorial representation of a display example of the edit screen when a first lock is set on the first object in the layout area.

FIG. 7 depicts a state immediately after, in the state depicted in FIG. 6, the user has selected "first lock" from the second context menu 72b. In this case, the PC 1 displays the first lock mark M1, which indicates that the first lock is set, at a location in the −X direction and in the −Y direction of the object region of the first object OJ1. In addition, in response to selection of "first lock" from the second context menu 72b, the PC 1 changes the color of the handles 71 of the first object OJ1 from blue to, for example, white. The blue handles 71 are a selection decoration indicating selection of the object OJ that is not locked, and the white handles 71 are a selection decoration indicating selection of the object OJ that is locked.

Figure 8:
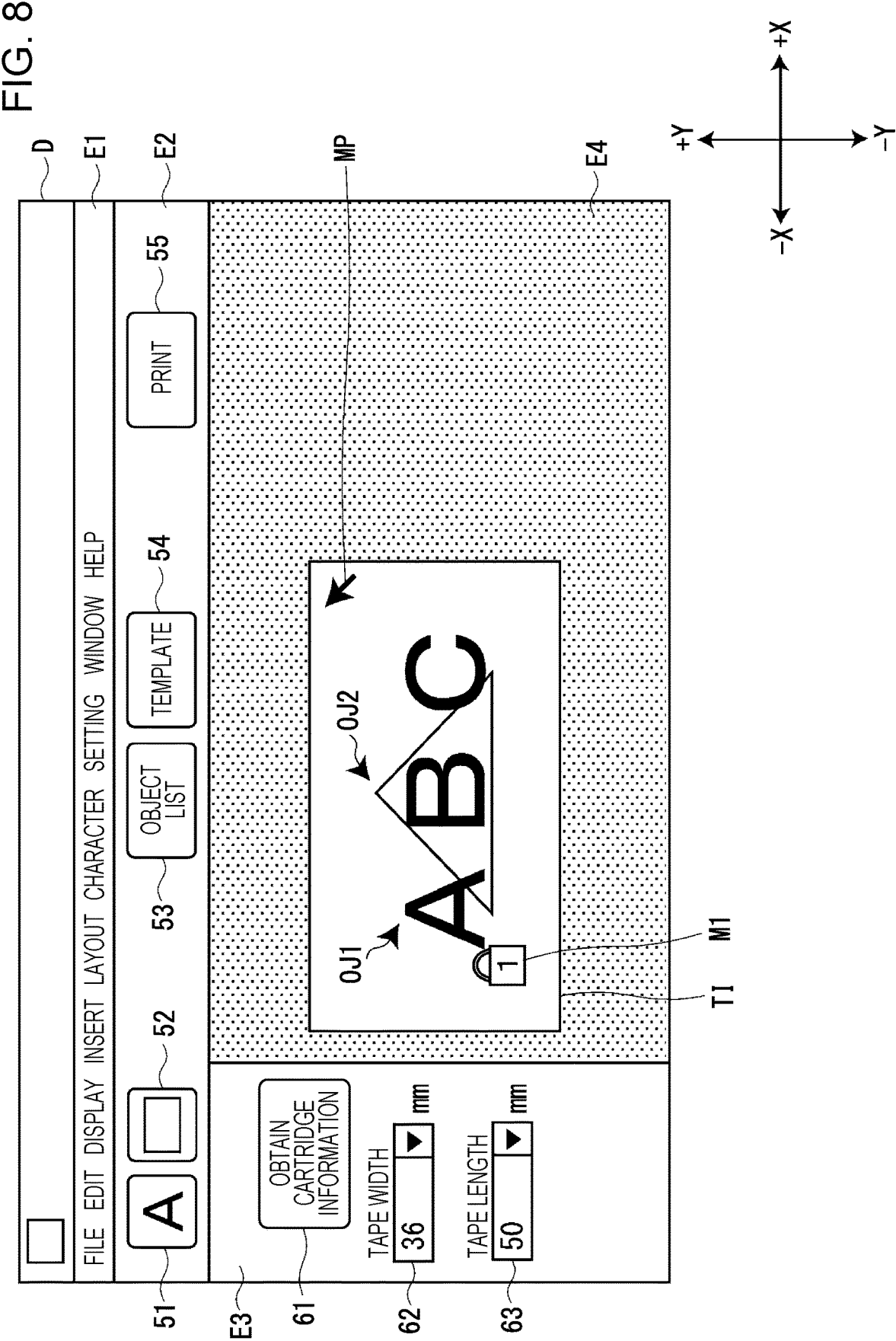
FIG. 8 is a pictorial representation of a display example of the edit screen on which the first object, to which a first lock mark is added, and the second object, to which no lock mark is added, are displayed in the layout area.

FIG. 8 depicts a state after, with the white handles 71 added to the first object OJ1 as depicted in FIG. 7, the user has selected a location outside the object region of the first object OJ1 in the layout area E4. In this case, the PC 1 hides from view the handles 71 of the first object OJ1.

Figure 9:
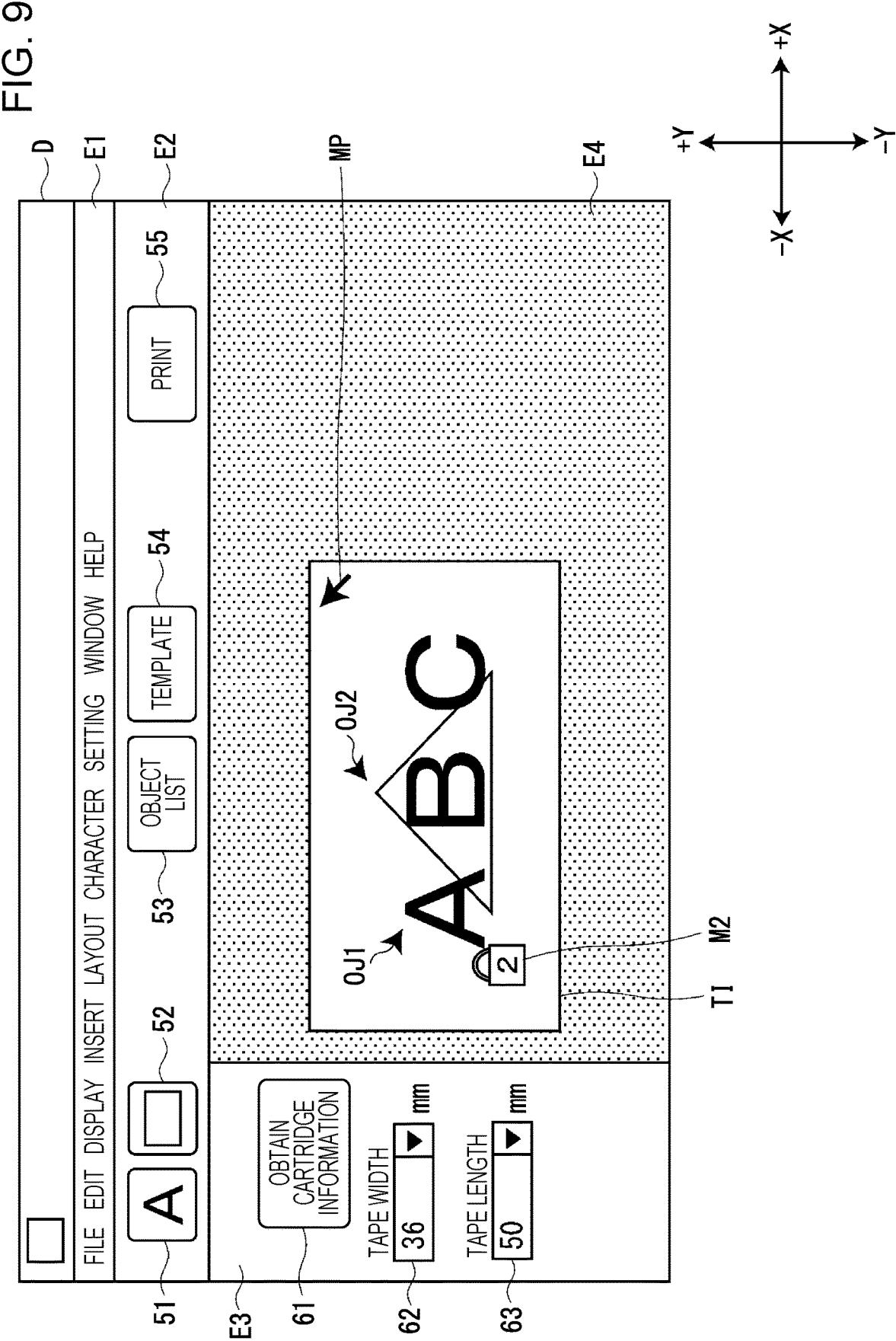
FIG. 9 is a pictorial representation of a display example of the edit screen on which the first object, to which a second lock mark is added, and the second object, to which no lock mark is added, are displayed in the layout area.

FIG. 9 depicts a state after, in the state depicted in FIG. 6, the user has selected "second lock" from the second context menu 72b and then has selected a location outside the object region of the first object OJ1 in the layout area E4. In this case, the PC 1 displays the second lock mark M2, which indicates that a second lock is set, at a location in the −X direction and the −Y direction of the object region of the first object OJ1.

Figure 10:
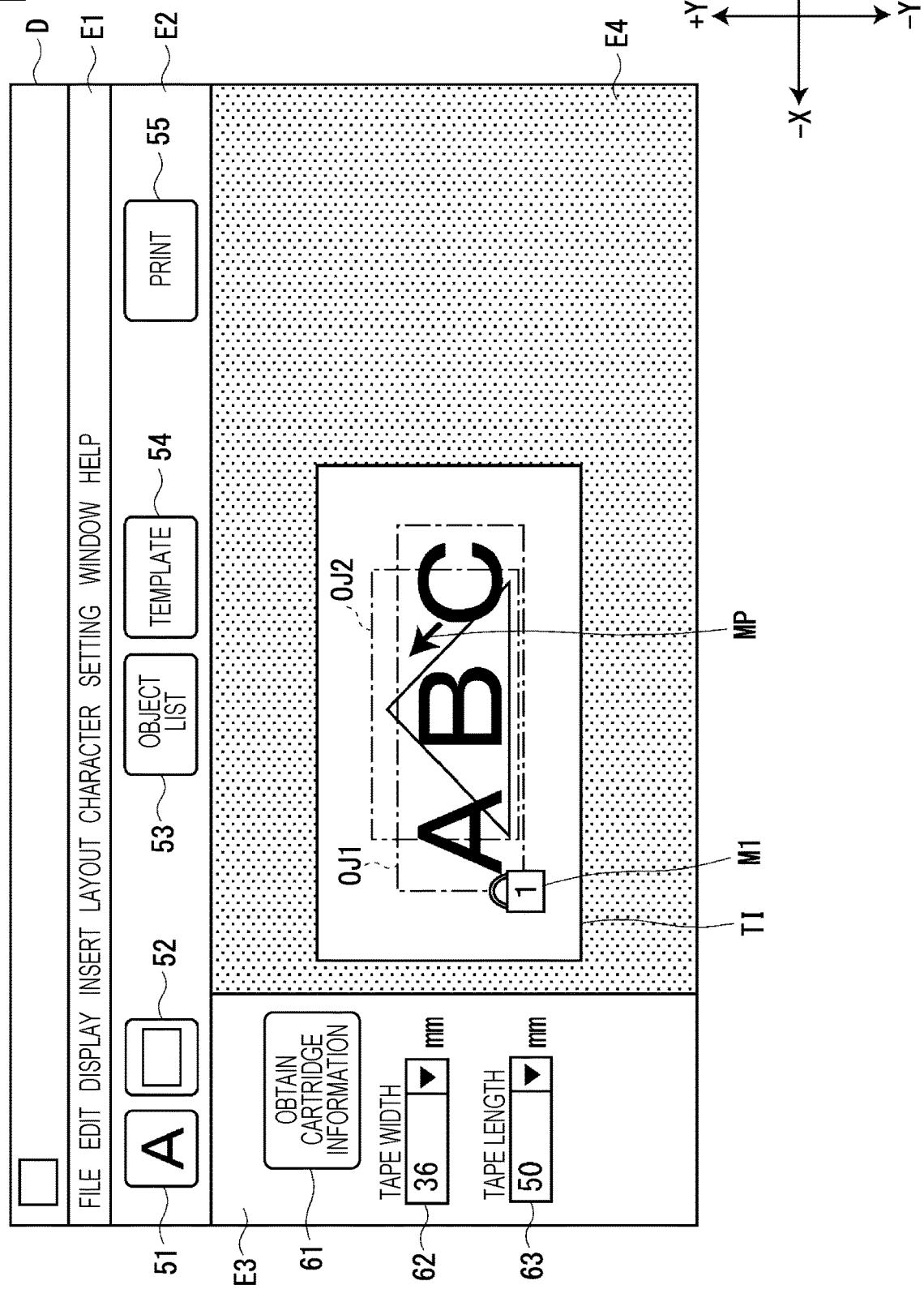
FIG. 10 is a pictorial representation of a display example of the edit screen prior to selecting, in the layout area, an overlapping area between the first object to which the first lock mark is added and the second object to which no lock mark is added.

FIG. 10 depicts a state where, from the state depicted in FIG. 8, the user has moved the mouse pointer MP to an overlapping area between the first object OJ1 and the second object OJ2. In FIG. 10, for ease to understand the overlapping area, the object regions of the first object OJ1 and the second object OJ2 are indicated by dash-dot lines.

Figure 11:
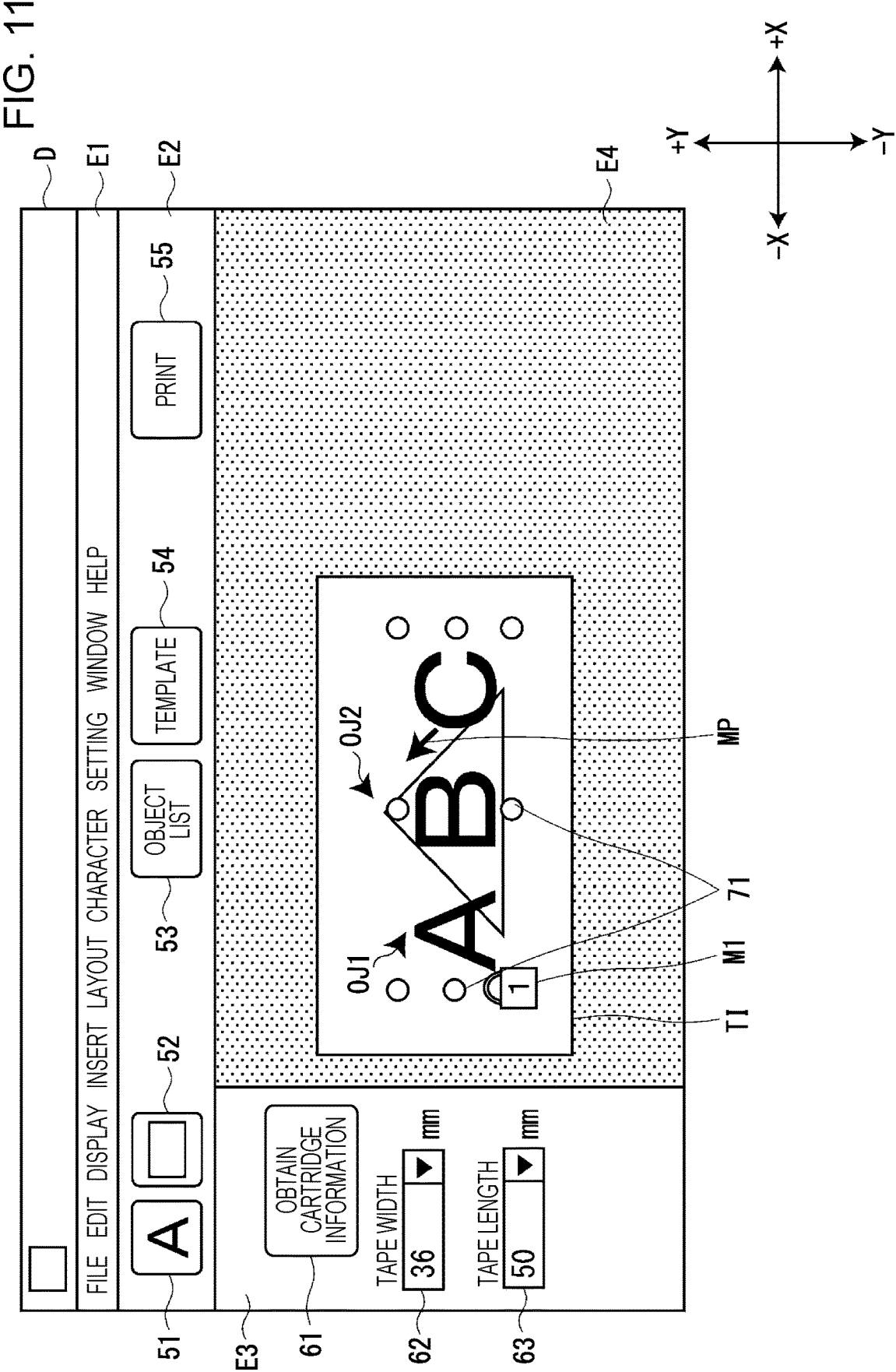
FIG. 11 is a pictorial representation of a display example of the edit screen after selecting, in the layout area, the overlapping area between the first object to which the first lock mark is added and the second object to which no lock mark is added.

FIG. 11 depicts a state after, in the state depicted in FIG. 10, the user has left-clicked the mouse 12a. That is, FIG. 11 depicts a state where the overlapping area between the first object OJ1, on which the first lock is set, and the second object OJ2 is selected. In this case, the PC 1 displays the first object OJ1 such that the handles 71 indicating selection are added to the first object OJ1. The handles 71 displayed at this point are white since the first object OJ1 is locked. In such a manner, with the first lock set on the first object OJ1, in response to selection of the overlapping area between the first object OJ1 and the second object OJ2, the PC 1 sets the first object OJ1 to a selected state.

Figure 12:
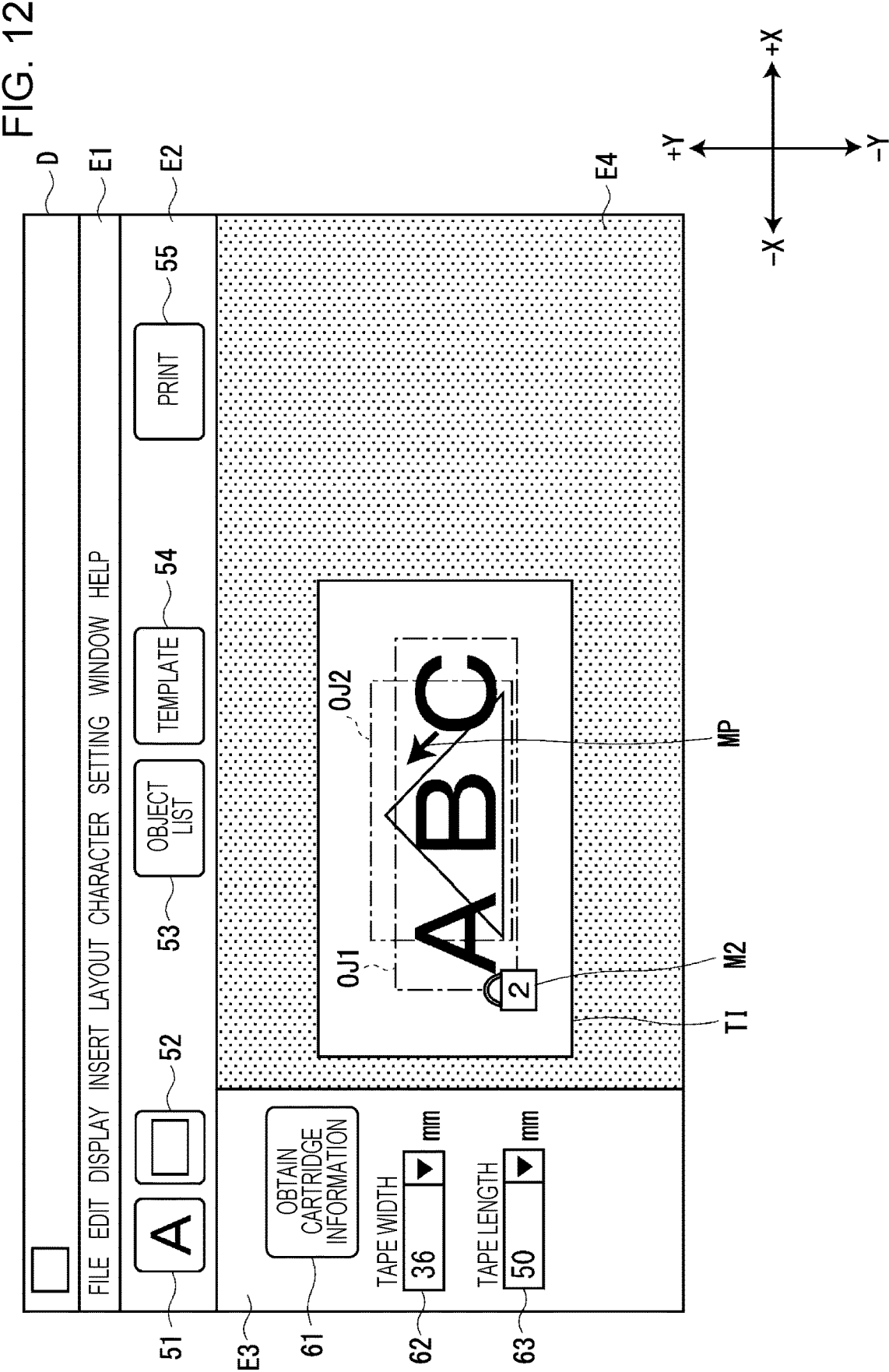
FIG. 12 is a pictorial representation of a display example of the edit screen prior to selecting, in the layout area, an overlapping area between the first object to which the second lock mark is added and the second object to which no lock mark is added.

FIG. 12 depicts a state where, from the state depicted in FIG. 9, the user has moved the mouse pointer MP to the overlapping area between the first object OJ1 and the second object OJ2. In FIG. 12, for ease to understand the overlapping area, the object regions of the first object OJ1 and the second object OJ2 are indicated by dash-dot lines.

Figure 13:
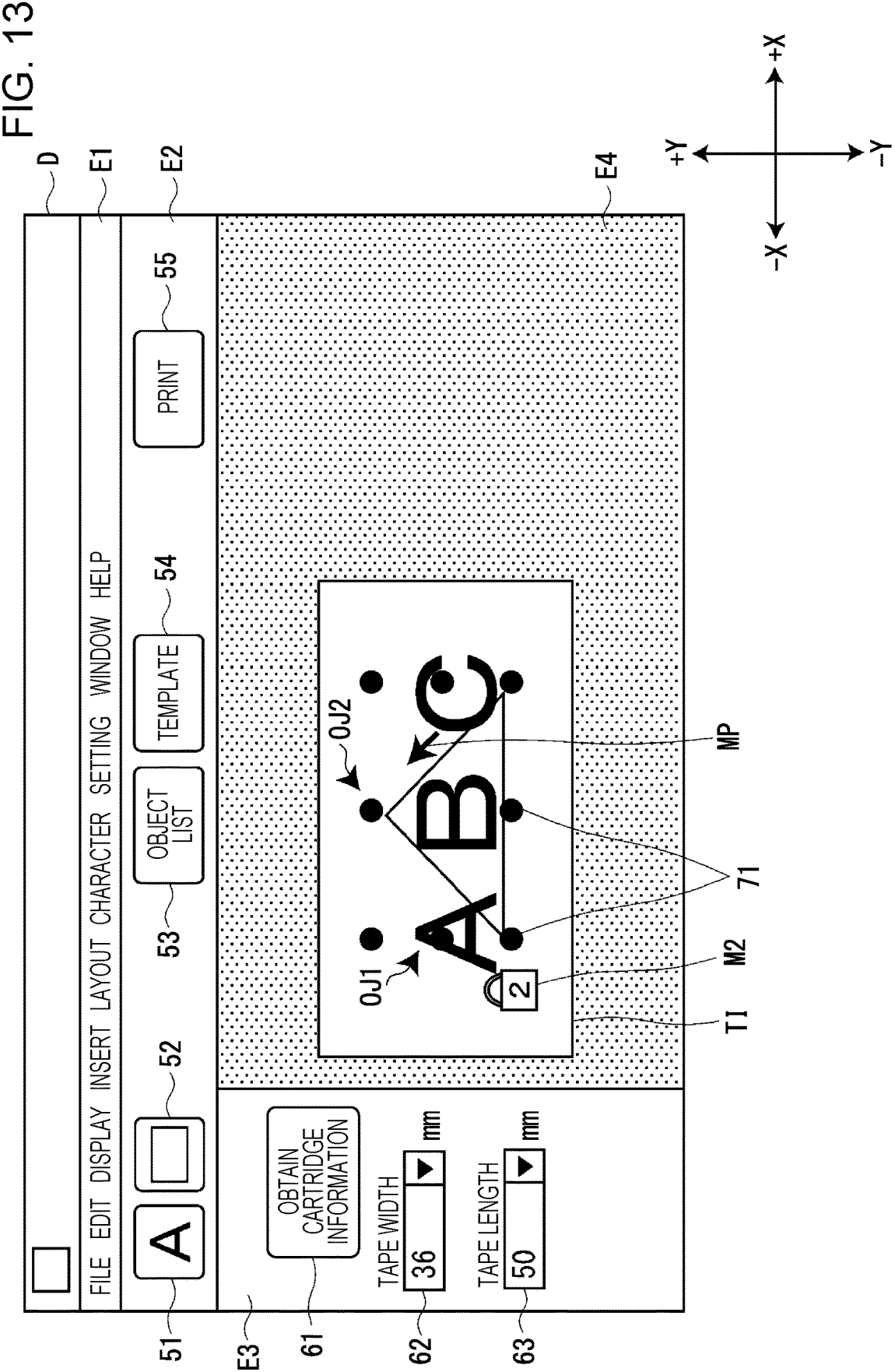
FIG. 13 is a pictorial representation of a display example of the edit screen after selecting, in the layout area, the overlapping area between the first object to which the second lock mark is added and the second object to which no lock mark is added.

FIG. 13 depicts a state after, in the state depicted in FIG. 12, the user has left-clicked the mouse 12a. That is, FIG. 13 depicts a state where the overlapping area between the first object OJ1, on which the second lock is set, and the second object OJ2 is selected. In this case, the PC 1 displays the second object OJ2 such that the handles 71 indicating selection are added to the second object OJ2. The handles 71 displayed at this point are blue since the second object OJ2 is not locked. In such a manner, when the second lock is set on the first object OJ1, in response to selection of the overlapping area between the first object OJ1 and the second object OJ2, the PC 1 sets the second object OJ2 to a selected state.

In such a manner, the user may easily select the second object OJ2 located behind the first object OJ1 by setting the second lock on the first object OJ1. Thereby, troubles, such as accidentally selecting the first object OJ1 in editing the second object OJ2 located behind the first object OJ1, may be avoided.

FIG. 14 depicts a state where, with the second lock set on the first object OJ1 and the first lock set on the second object OJ2, the object list button 53 has been selected by the user. In response to selection of the object list button 53, the PC 1 displays the object list OJL, which is a list of the locked objects OJ among the objects OJ displayed in the layout area E4, at a location in the +X direction and the +Y direction of the layout area E4. The object list OJL is not limited to being displayed at a location that is the +X direction and the +Y direction of the layout area E4 and may be displayed at any location or may be displayed on a screen different from the edit screen D.

In the example depicted in FIG. 14, since the two objects OJ are locked, two pieces of object information 80 are displayed in the object list OJL. That is, in the object list OJL depicted in FIG. 14, first object information 81 corresponding to the first object OJ1 and second object information 82 corresponding to the second object OJ2 are displayed.

The object information 80 includes lock mark information 80a and identification information 80b. The identification information 80b is a reduced image of the corresponding object OJ. Viewing the identification information 80b, the user determines which object OJ displayed in the layout area E4 the object information 80 corresponds to.

The lock mark information 80a is a mark having substantially the same shape as the first lock mark M1 or the second lock mark M2. For example, the lock mark information 80a in which a numeric character "1" is superimposed on a lock illustration indicates that the first lock is set, and the lock mark information 80a in which a numeric character "2" is superimposed on a lock illustration indicates that the second lock is set.

When the user selects the lock mark information 80a from the object list OJL, the PC 1 releases the lock set on the corresponding object OJ and hides from view the lock mark information 80a. Selection of the lock mark information 80a corresponds to the selection of the object OJ on which the lock is to be released, which is received by the lock release receiver 130 mentioned above. By the lock mark information 80a being hidden from view, the user may determine that the lock on the corresponding object OJ has been released.

Regarding the object OJ on which the first lock is set, the lock may be released using the context menu 72. FIG. 15 depicts a state where, by the user, the second object OJ2 on which the first lock is set has been selected and furthermore the context menu 72 has been displayed. When the second object OJ2 on which the first lock is set is selected, the PC 1 displays the second object OJ2 to which the white handles 71 are added.

In addition, when, while the white handles 71 are added to the second object OJ2, the user right-clicks the mouse 12a, the PC 1 displays the context menu 72. In such a manner, when the first lock is set on the object OJ, "lock release" is displayed as an option of the operation menu in the context menu 72. When "lock release" is selected from the context menu 72 by the user, the PC 1 releases the first lock set on the second object OJ2. Selection of the second object OJ2 in FIG. 15 corresponds to the selection of the object OJ on which the lock is to be released, which is received by the lock release receiver 130 mentioned above.

Figure 16:
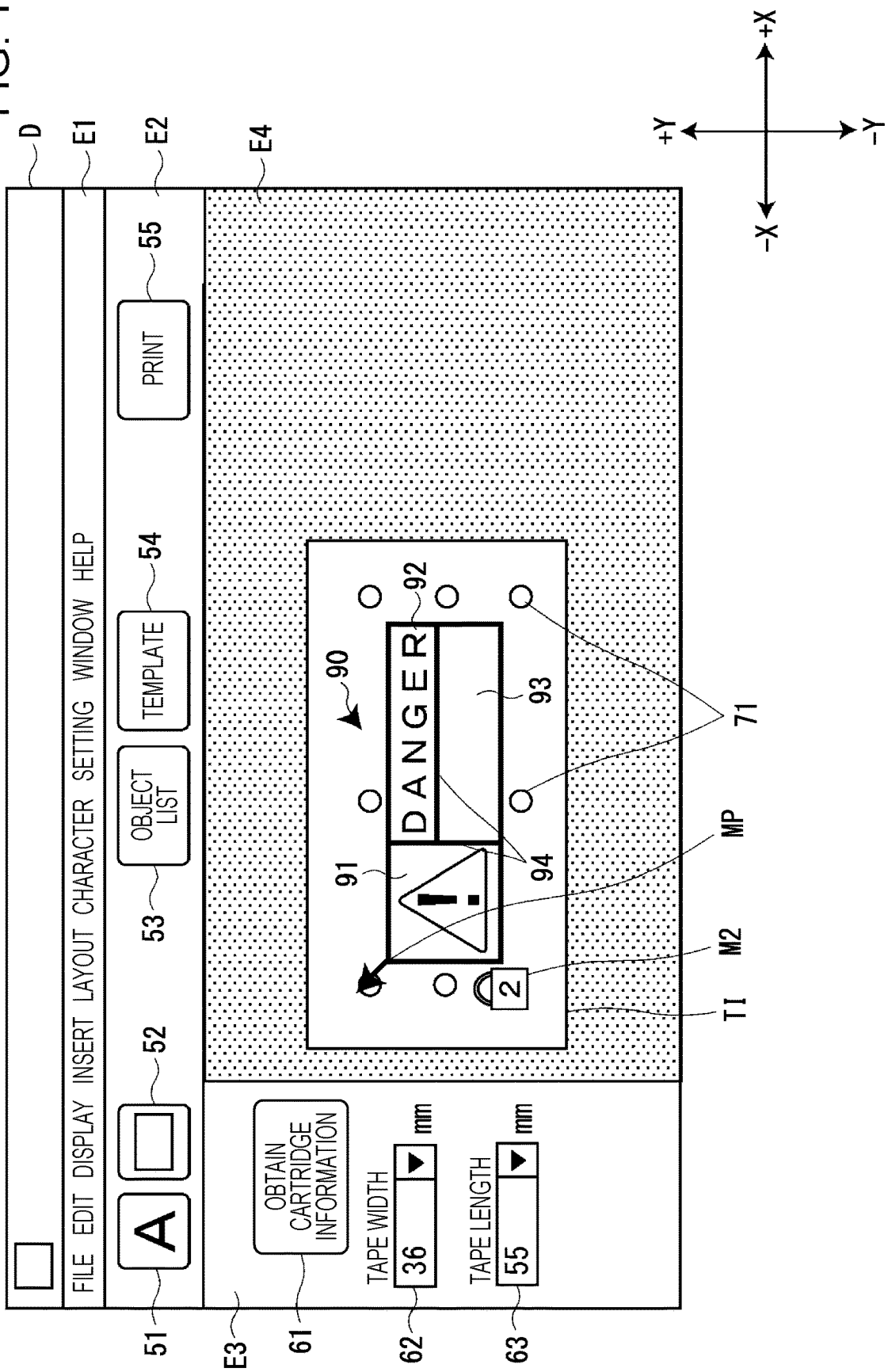
FIG. 16 is a pictorial representation of a display example of the edit screen on which a template is displayed in the layout area.

FIG. 16 depicts a state immediately after the template 90 has been displayed in the layout area E4, which is different from the examples depicted in the figures to FIG. 15. As described above, after selecting the template button 54, the user selects a desired template 90 from the template menu, which enables the desired template 90 to be displayed in the layout area E4.

In the template 90 depicted in FIG. 16, a first template area 91, which is a partial area in the −X direction of the template 90, a second template area 92, which is an area adjacent in the +X direction to the first template area 91, and a third template area 93, which is an area adjacent in the −Y direction to the second template area 92, are partitioned by ruled lines 94. In addition, the background of any area of the template 90 is set to be transparent. In the first template area 91, an illustration is displayed in which an exclamation mark is superimposed on a triangle shape. In addition, in the second template area 92, text "DANGER" is displayed. In addition, the third template area 93 is blank.

As depicted in FIG. 16, the second lock mark M2 is added to the template 90 immediately after the template 90 has been displayed in the layout area E4. That is, the second lock is set on the template 90 immediately after the template 90 has been displayed in the layout area E4. Thereby, the user may be less likely to accidentally edit the template 90. In addition, the user may create the object OJ in front of or behind the template 90. For example, the user may create, as the object OJ, text or a graphic to be displayed in the third template area 93, and arrange the created object OJ to overlap the template 90. In this case, even when the user arranges the object OJ behind the template 90, the template 90 is non-selectable because of the second lock, and therefore the user may easily select and edit the object OJ.

Next, with reference to the flowchart in FIG. 17, an object selection process executed by the PC 1 will be described. The object selection process starts when any location in the layout area E4 is selected.

At step S01, the PC 1 determines whether the object OJ is present at a location selected by the user in the layout area E4, that is, at a click location of the mouse 12a. If it is determined that the object OJ is present at the click location of the mouse 12a, the PC 1 proceeds to step S03. Alternatively, if it is determined that the object OJ is not present at the click location of the mouse 12a, the PC 1 proceeds to step S02.

At step S02, the PC 1 does not select the object OJ. After step S02, the PC 1 terminates the object selection process.

At step S03, the PC 1 temporarily selects the top object OJ at the click location of the mouse 12a. The PC 1 does not display the handles 71 at a point in time at which the object OJ is temporarily selected.

At step S04, the PC 1 determines whether the second lock is set on the temporarily selected object OJ. If it is determined that the second lock is set on the temporarily selected object OJ, the PC 1 proceeds to step S06. Alternatively, if it is determined that the second lock is not set on the temporarily selected object OJ, the PC 1 proceeds to step S05.

At step S05, the PC 1 finally selects the temporarily selected object OJ. That is, at step S05, the PC 1 displays the handles 71 around the temporarily selected object OJ.

At step S06, the PC 1 determines whether the object OJ is present behind the temporarily selected object OJ. If it is determined that the object OJ is present behind the temporarily selected object OJ, the PC 1 proceeds to step S07. Alternatively, if it is determined that the object OJ is not present behind the temporarily selected object OJ, the PC 1 proceeds to step S02.

At step S07, the PC 1 temporarily selects the object OJ located behind the temporarily selected object OJ. After step S07, the PC 1 returns to step S04.

As described above, the PC 1 according to the present embodiment displays the lock mark M, which indicates whether the first lock or the second lock is set on the object OJ, on the PC display 11. This enables the user to distinguish between the object OJ on which a selectable lock is set and the object OJ on which a non-selectable lock is set.

In addition, in the case where the first object OJ1 and the second object OJ2, which is located behind the first object OJ1, overlapping each other are displayed, with the first lock set on the first object OJ1, in response to selection of the overlapping area between the first object OJ1 and the second object OJ2, the PC 1 applies a selection decoration to the first object OJ1. In addition, with the second lock set on the first object OJ1, in response to selection of the overlapping area between the first object OJ1 and the second object OJ2, the PC 1 applies a selection decoration to the second object OJ2. Thereby, when two objects OJ are displayed in an overlapping manner, the user may determine which object OJ is selected.

In addition, the PC 1 sets a second lock on the template 90 read out from the storage 15 and displayed on the PC display 11. Thereby, the template 90 does not become a selected state, and therefore the user may easily edit objects and so on other than the template 90.

In addition, the PC 1 displays the object list OJL, which is a list of the objects OJ on each of which a lock is set, and receives selection of the object OJ on which the lock is to be released. Thereby, the user may easily release locks including the second lock with which the object OJ is incapable of being selected.

In addition, the PC 1 adds the first lock mark M1 to the object OJ on which the first lock is set, and adds the second lock mark M2 different from the first lock mark M1 to the object OJ on which the second lock is set. Thereby, by a difference in the lock mark M, the user may easily distinguish between the object OJ on which a selectable lock is set and the object OJ on which a non-selectable lock is set.

Irrespective of the embodiment described above, modifications described below may be employed.

First Modification

The PC 1 may display the object OJ that is locked, such that a mark or text other than the lock mark M is added to the object OJ. In addition, the PC 1 may provide a lock decoration to the locked object OJ in some way other than adding a mark or text to the object OJ. For example, the PC 1 may provide a lock decoration to the locked object OJ in a way of displaying the object frame of the object OJ in a specific color or a specific line style, displaying the object frame of the object OJ in a flashing manner, or the like.

In addition, the PC 1 may change the display form of the object OJ itself, as a lock decoration. For example, the PC 1 may provide a lock decoration in a way of displaying the locked object OJ in a specific color, that is, displaying the locked object OJ in a specific transparency, displaying the locked object OJ in a shaded manner, or the like.

Second Modification

The PC 1 may display the lock mark M on the object OJ that is locked, not always but only when the mouse pointer MP is close to the object OJ or when the mouse pointer MP enters the object region.

Third Modification

The PC 1 may display the object list OJL as lock information indicating whether the first lock or the second lock is set on the object OJ. In this case, the object list OJL may be displayed not only when the object list button 53 is selected, but also at any time while the edit screen D is displayed. Despite being an example of lock information, the object list OJL is not a decoration applied to the object OJ and may be displayed at a location apart from the object region, and therefore, the object list OJL does not constitute a lock decoration.

Fourth Modification

The PC 1 may display the object list OJL including the object information 80 of the object OJ that is not locked. That is, the PC 1 may display the object list OJL including the object information 80 of all the objects OJ displayed in the layout area E4.

In addition, using the object list OJL, the PC 1 may enable not only lock releasing but also lock setting to be received. For example, when, while the lock mark information 80a is not displayed in the display area of the lock mark information 80a, the user selects the display area of the lock mark information 80a, the PC 1 may again display the original lock mark information 80a. That is, each time the user clicks the display area of the lock mark information 80a, the PC 1 may cause the corresponding object OJ to sequentially switch between a lock state and a non-lock state.

In addition, each time the user clicks the display area of the lock mark information 80a, the PC 1 may cause the lock state of the corresponding object OJ to sequentially switch among a state where the first lock is set, a state where the second lock is set, and the non-lock state.

Fifth Modification

The PC 1 may use tabs displayed in the tab menu area E1 to receive lock setting and to receive lock releasing. For example, the PC 1 may display "lock" and "lock release" as function menus that are displayed when "Layout" is selected from the tabs displayed in the tab menu area E1.

In addition, the PC 1 may use tabs displayed in the tab menu area E1 to receive display of the object list OJL and to receive insertion of the template 90.

Sixth Modification

The PC 1 may enable receipt of collective lock release, which releases locks of all the locked objects OJ. In this case, the PC 1 may display a collective lock release button (not illustrated) for issuing an instruction for the collective lock release, for example, in the function button area E2. In addition, the PC 1 may use a tab displayed in the tab menu area E1 to receive the collective lock release.

Seventh Modification

The template 90 may not be necessarily constituted by a single object OJ. For example, in the case of the template 90 depicted in FIG. 16, the template 90 may be constituted of three objects OJ, which correspond to the first template area 91, the second template area 92, and the third template area 93. When the template 90 is constituted of a plurality of objects OJ in such a manner, the plurality of objects OJ may be grouped at a point in time at which the template 90 is displayed in the layout area E4.

In addition, when the template 90 is constituted of a plurality of objects OJ, second locks may not be necessarily set on all the objects OJ. For example, the template 90 depicted in FIG. 16 may be such that second locks are set on two objects OJ corresponding to the first template area 91 and the second template area 92 and no lock is set on the object OJ corresponding to the third template area 93.

Eighth Modification

The PC 1 may cause the selection decoration for the locked object OJ to be the same as the selection decoration for the object OJ that is not locked. For example, the PC 1 may cause the color of the handles 71 added to the locked object OJ to be the same as the color of the handles 71 added to the object OJ that is not locked.

In addition, the PC 1 may cause the selection decoration for the object OJ on which the first lock is set to be different from the selection decoration for the object OJ on which the second lock is set. For example, the PC 1 may add the white handles 71 to the object OJ on which the first lock is set and may add gray handles 71 to the object OJ on which the second lock is set.

In addition, the PC 1 may perform the selection decoration in a way other than adding the handles 71. For example, the PC 1 may perform the selection decoration in a way of adding an object frame to the selected object OJ, displaying the object OJ in a specific color, highlighting the object OJ, or the like.

Ninth Modification

The functional configuration of the PC 1 illustrated in FIG. 4 may be implemented by the tape printing apparatus 2. In this case, the functional configuration illustrated in FIG. 4 is implemented by the printing apparatus CPU 44*a* executing firmware stored in the printing apparatus ROM 44*b*. In addition, in this case, the printing apparatus display 22 is an example of the display and the printing apparatus ROM 44*b* is an example of a storage.

Tenth Modification

In the embodiment described above, the lock refers to setting for disabling the movement of the object OJ, but may refer to setting for disabling editing of the object OJ. That is, the first lock may be a lock with which the object OJ is selectable and is not editable, and the second lock may be a lock with which the object OJ is non-selectable and is not editable.

Eleventh Modification

The information processing apparatus may be, instead of the PC 1, an information processing terminal, such as a smartphone. In addition, the tape printing application 30 may be offered as a program to the customer. In addition, a storage medium in which the tape printing application 30 is recorded may be offered to the customer. Furthermore, various changes may be made as appropriate without departing from the scope of the present disclosure.

Appendices

Hereafter, appendices for an information processing apparatus, a method for controlling an information processing apparatus, and a storage medium will be described below.

The PC 1 includes the PC display 11 configured to display at least one object OJ, the lock setter 120 configured to set, on the at least one object OJ, a lock that is either a first lock with which the at least one object OJ is selectable or a second lock with which the at least one object OJ is non-selectable, and the display controller 150 configured to cause the PC display 11 to display lock information indicating whether the first lock or the second lock is set on the at least one object OJ.

A method for controlling the PC 1 is performed by the PC 1. The method includes setting, on the object OJ, a lock that is either a first lock with which the object OJ is selectable or a second lock with which the object OJ is non-selectable, and causing the PC display 11 to display lock information indicating whether the first lock or the second lock is set on the object OJ.

The tape printing application 30 causes the PC 1 to execute setting, on the object OJ, a lock that is either a first lock with which the object OJ is selectable or a second lock with which the object OJ is non-selectable, and causing the PC display 11 to display lock information indicating whether the first lock or the second lock is set on the object OJ.

According to this configuration, the user may distinguish between the object OJ on which a selectable lock is set and the object OJ on which a non-selectable lock is set.

In the PC 1 described above, the at least one object includes a first object OJ1 and a second object OJ2. When, on the PC display 11, the first object OJ1 and the second object OJ2 located behind the first object OJ1 overlapping each other are displayed, the display controller 150 may be configured to, with the first lock set on the first object OJ1, in response to selecting an overlapping area between the first object OJ1 and the second object OJ2, cause the PC display 11 to display the first object OJ1 to which a selection decoration indicating the selection is applied, and, with the second lock set on the first object OJ1, in response to selecting the overlapping area between the first object OJ1 and the second object OJ2, cause the PC display 11 to display the second object OJ2 to which a selection decoration indicating the selection is applied.

According to this configuration, when two objects OJ are displayed in an overlapping manner, the user may determine which object OJ is selected.

The PC 1 described above may further include the storage 15 storing the template 90 handled as the at least one object OJ, and the lock setter 120 may set the second lock on the template 90 read out from the storage 15 and displayed on the PC display 11.

According to this configuration, the user may easily edit items other than templates.

In the PC 1 described above, the display controller 150 may be configured to cause the PC display 11 to display the object list OJL that is a list of the at least one object OJ on which the lock is set. The PC 1 may further include the lock release receiver 130 configured to receive selection of, from among the at least one object OJ displayed in the object list OJL, the object OJ on which the lock is to be released, and the lock releaser 140 configured to release the lock on the object OJ the selection of which is received by the lock release receiver 130.

According to this configuration, the user may easily release locks including the second lock with which the object OJ is incapable of being selected.

In the PC 1 described above, the lock information is a lock decoration that is applied to the at least one object OJ, and the display controller 150 is configured to cause the PC display 11 to display the at least one object OJ to which a first lock decoration is applied when the first lock is set on the at least one object OJ and to display the at least one object OJ to which a second lock decoration different from the first lock decoration is applied when the second lock is set on the at least one object OJ.

According to this configuration, by a difference in a lock decoration applied to the object OJ, the user may easily distinguish between the object OJ on which a selectable lock is set and the object OJ on which a non-selectable lock is set.

What is claimed is:

1. An information processing apparatus, comprising:
   a display configured to display at least one object;
   a lock setter configured to set, on the at least one object, a lock that is either a first lock with which the at least one object is selectable and is editable or a second lock with which the at least one object is non-selectable and is non-editable; and
   a display controller configured to cause the display to display lock information indicating whether the first lock or the second lock is set on the at least one object, wherein
   the lock information is a lock decoration that is applied to the at least one object, and
   the display controller is configured to cause the display to display the at least one object to which a first lock decoration is applied when the first lock is set on the at least one object and to display the at least one object to which a second lock decoration different from the first lock decoration is applied when the second lock is set on the at least one object.

2. The information processing apparatus according to claim 1, wherein
   the at least one object includes a first object and a second object, and
   when, on the display, the first object and the second object located behind the first object overlapping each other are displayed,
   the display controller is configured to:
      with the first lock set on the first object, in response to selecting an overlapping area between the first object and the second object, cause the display to display the first object to which a selection decoration indicating the selection is applied, and with the second lock set on the first object, in response to selecting the overlapping area between the first object and the second object, cause the display to display the second object to which a selection decoration indicating the selection is applied.

3. The information processing apparatus according to claim 1, further comprising:
   a storage storing a template handled as the at least one object; wherein
   the lock setter is configured to set the second lock on the template read out from the storage and displayed on the display.

4. The information processing apparatus according to claim 1, wherein
   the display controller is configured to cause the display to display an object list that is a list of the at least one object on which the lock is set,
   the information processing apparatus further comprising:
   a lock release receiver configured to receive selection of, from among the at least one object displayed in the object list, the object on which the lock is to be released; and
   a lock releaser configured to release the lock on the object the selection of which is received by the lock release receiver.

5. A method for controlling an information processing apparatus, the method being performed by an information processing apparatus, the method comprising:
   setting, on an object, a lock that is either a first lock with which the object is selectable and is editable or a second lock with which the object is non-selectable and is non-editable; and
   causing a display to display lock information indicating whether the first lock or the second lock is set on the object, wherein
   the lock information is a lock decoration that is applied to the object, and
   the display controller is configured to cause the display to display the object to which a first lock decoration is applied when the first lock is set on the object and to display the object to which a second lock decoration different from the first lock decoration is applied when the second lock is set on the object.

6. A non-transitory computer-readable storage medium storing a program causing an information processing apparatus to execute:
   setting, on an object, a lock that is either a first lock with which the object is selectable and is editable or a second lock with which the object is non-selectable and is non-editable; and
   causing a display to display lock information indicating whether the first lock or the second lock is set on the object, wherein
   the lock information is a lock decoration that is applied to the object, and
   the display controller is configured to cause the display to display the object to which a first lock decoration is applied when the first lock is set on the object and to display the object to which a second lock decoration different from the first lock decoration is applied when the second lock is set on the object.

\* \* \* \* \*